Sept. 2, 1969             B. J.-R. BANVILLE            3,465,147
GAS FLOW NUCLEAR DETECTOR CELL UTILIZING THIN
SCINTILLATION MATERIAL IN A
SPIRAL ARRANGEMENT Filed May 3, 1965                                                   2 Sheets-Sheet 1

INVENTOR
BERTRAND J.-R. BANVILLE
BY Smart & Biggar
ATTORNEYS.

Sept. 2, 1969   B. J.-R. BANVILLE   3,465,147
GAS FLOW NUCLEAR DETECTOR CELL UTILIZING THIN
SCINTILLATION MATERIAL IN A
SPIRAL ARRANGEMENT
Filed May 3, 1965   2 Sheets-Sheet 2

LEGEND
• TRITIATED WATER MOLECULE
∘ ORDINARY WATER MOLECULE
→ TRAJECTORY OF THE DISINTEGRATION BETA PARTICLE

INVENTOR
BERTRAND J.-R. BANVILLE
BY Smart & Biggar
ATTORNEYS.

3,465,147
GAS FLOW NUCLEAR DETECTOR CELL UTILIZING THIN SCINTILLATION MATERIAL IN A SPIRAL ARRANGEMENT
Bertrand J.-R. Banville, Dorval, Quebec, Canada, assignor to Atomic Energy of Canada Limited, Ottawa, Ontario, Canada, a corporation of Canada
Filed May 3, 1965, Ser. No. 452,466
Int. Cl. G01t 1/20
U.S. Cl. 250—71.5   3 Claims

ABSTRACT OF THE DISCLOSURE

A highly sensitive detector cell that can be used for coincidence nuclear radiation detection in fluid media; the detector core disposed in a casing is in the form of two spirally wound juxtaposed strips of light conductive scintillating material defining a double spiral flow path, with the edges of both strips being light-coupled to photomultiplier tubes via and windows.

---

This invention relates to apparatus for detecting nuclear radiations and, in particular, to a highly sensitive detector cell adapted for the efficient detection of low-energy $\beta$ particle-emitting nuclides such as tritium in tritiated water vapour. Although in the following description of the invention, particular reference is made to the detection of tritium in water vapour, in respect of which the invention is particularly useful, it will be apparent to persons skilled in the art that the detector cell herein disclosed can with advantage be applied to the detection of other types of nuclear radiation.

Tritium is a radioactive isotope of hydrogen produced by the action of neutrons on deuterium such as that found in heavy water ($D_2O$) used in nuclear power plants. Deuterium ($H^2$ or D) is an isotope of hydrogen (H), formed of one neutron and one proton. When one neutron combines to a molecule of deuterium, a molecule of tritium ($H^3$) is formed (one proton and two neutrons). Tritium can be found in many chemical forms and particularly in the form of water vapour having the following compositions: $H_2{}^3O$, $H^3H^2O$ or $H^3H^1O$, i.e. water or heavy water molecules in which either one or both of the hydrogen (H) atoms or deuterium ($H^2$) molecules have been replaced by a tritium ($H^3$) molecule.

The detection of tritiated water vapours becomes extremely important for providing radiation protection o the personnel of a nuclear power plant, working in the vicinity of nuclear reactors using heavy water for the moderation of fission neutrons. Leakages of heavy water contaminated with tritium will lead to tritiated water vapour in the atmosphere which is breathed by the workers. With about equal efficiency as it is absorbed through the lungs, tritiated water vapour will also be taken into the body through the skin.

The accepted limit of tritium in air for safe continued human occupancy is $5 \times 10^{-6} \mu c./cc.$ (microcurie per cubic centimeter) for 40 hours exposure per week. Such concentrations of tritium will frequently occur in locations where there are other sources of nuclear radiation such as Argon (Ar–41), Xeon (Xe–138) and Kripton (Kr–85) and, possibly, above natural levels of gamma ($\gamma$) radiation do well. The above-mentioned gases are much less toxic than tritiated water vapour because of their less effective incorporation in the body. Moreover, the maximum permissible concentration of tritium produces an ion current which is only .02 of the current produced by the corresponding maximum permissible intensity of gamma radiation. It follows that a satisfactory tritium monitor must have a small response to gamma radiation and to other radioactive gases such as Xe–133, Kr–85 and Ar–41.

Tritium in air may be detected by flowing the air through an ionization chamber and measuring the current produced. However, such an instrument will also detect external gamma radiation to such an extent that steps must be taken to cancel this contribution. It is, therefore, customary to use two ion chambers connected in opposition with a confined clean air volume in one and the air to be examined for tritium concentration flowing through the other. In principle, this is a straightforward procedure but its practical realization is difficult and it is unusual to get cancellation of the gamma radiation contribution to better than a few percent. As far as other radioactive gases are concerned the ion chamber is incapable of distinguishing tritium from other contaminants in the air.

Nuclear scintillation counters can also be used for detecting nuclear radiation. In these instruments a piece or crystal of scintillation material is exposed to the nuclear radiation of a solid, liquid or gaseous body being monitored, and a photosensitive device records the scintillation light radiation that the scintillator emits in response to the nuclear radiation. A variety of such nuclear scintillation monitors are suggested in United States Patent No. 3,005,100 issued on Oct. 17, 1961, to T. J. Thompson. However, none of these prior forms of monitors are capable of efficiently detecting low energy $\beta$ particle-emitting nuclides such as that of tritium having a range of the order of a micron in solid matter and a millimeter in gas.

I have found that a satisfactory and highly efficient detector cell, having the sensitivity necessary to detect tritium in tritiated water vapour without the aforesaid disadvantages, can be obtained by using a scintillator core comprising at least one piece of scintillation material defining a flow path for a medium to be monitored, the said piece having two opposite edges (which extend generally parallel to the flow path) each of which is light-coupled to an optically clear window capable of being juxtaposed to the lightsensitive element of a photoelectric sensing device. By such an arrangement the light energy generated within or adjacent the scintillation material is directly "piped" to the windows and thence to the photoelectric sensing device, thereby conserving nearly all of the scintillation light until it reaches the lattter. As is well known to persons in the art "light piping" of this type is an optical phenomenon by which a beam of light is guided by, and maintained within the boundaries of a transparent body of material whose reflective index is greater than that of its surroundings.

In a preferred embodiment of my invention I provide a nuclear radiation detector cell which comprises an open-ended housing member which has inlet and outlet ports at convenient locations on its sides. Optically clear windows are sealed across each of the ends of the housing and two elongated pieces of relatively thin scintillation material are disposed edge-wise between the windows and optically coupled thereto, the pieces being formed into parallel spaced relationship so that they together define a double spiral which extends from the outer ends of the pieces adjacent the housing to the inner ends of the pieces near the center of the cell. Baffle members are provided which extend between the respective ports and the outer ends of the pieces so as to define a flow path for the medium to be monitored, such flow path including, respectively, the inlet port, the inlet baffle member, a first spiral channel defined by one set of surfaces of the pieces leading inwards to the center of the cell, a second spiral channel defined by the other set of surfaces of the pieces leading outwardly from the center of the cell, the outlet baffle member and the outlet port.

My invention will be described in connection with the following figures of drawings, in which.

Figure 1:
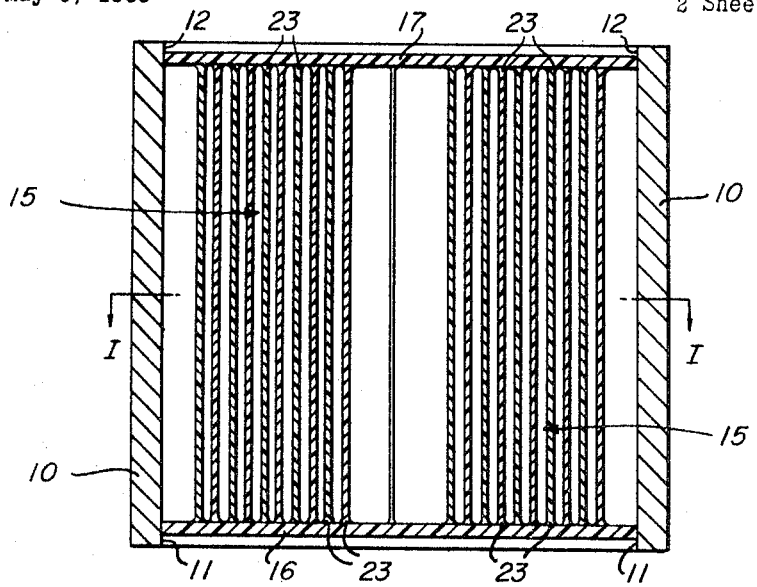
FIGURE 1 is a top plan view, in section, of a detector cell made in accordance with my invention, taken along the line I—I in FIGURE 2.
Figure 2:
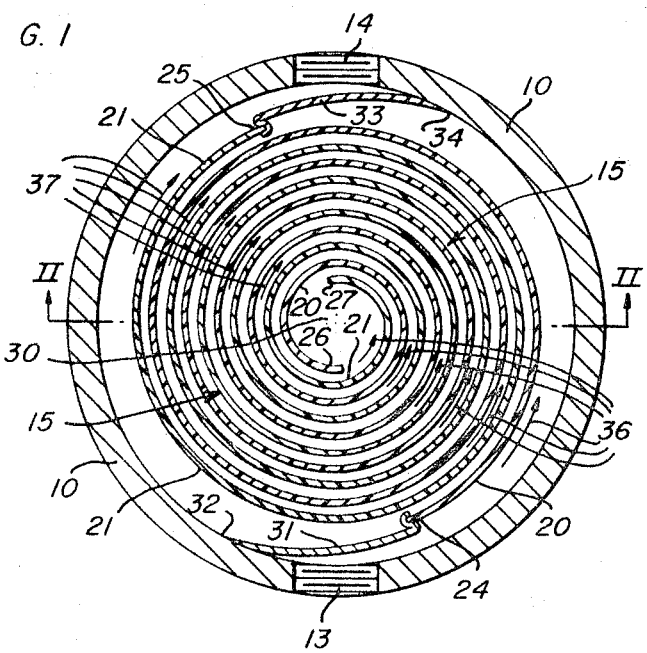
FIGURE 2 is a front elevational view, in section, of the same detector cell, taken along the line II—II in FIGURE 1.

Referring now to FIGURES 1 and 2, the particular embodiment of a detector cell in accordance with my invention there shown comprises a metal housing 10 of generally cylindrical shape having open ends 11 and 12, and, at convenient locations on its sides, inlet and outlet ports 13 and 14 respectively. The core for the detector generally represented at 15 is disposed within the housing and comprises optically clear windows 16 and 17, preferably made of a suitable plastic, which are sealed across the open ends 11 and 12 respectively of the housing 10 so as to form therewith a gas and liquid-tight container. Within the container thus formed there is disposed a scintillator comprising in the particular embodiment illustrated two elongated relatively thin strips 20 and 21 of scintillation material (for example plastic phosphor), disposed edge-wise between the windows and optically coupled thereto as shown at 23. The strips 20 and 21 are formed in relatively close spaced parallel relationship so as to form a double spiral extending from the outer ends 24, 25 of the strips 20, 21 respectively, both of which outer ends are located near the housing 10 as shown, into a point adjacent the center of the core where the inner ends 26, 27 respectively terminate so as to form a central chamber 30 as shown. An inlet baffle member 31, which is of the same width as the pieces 20 and 21, is also edge-wise disposed between the windows 16, 17 so that it extends from the outer end 24 of the piece 20 across the inlet port 13 to a point 32 on the housing 10. A similar outlet baffle member 33 extends from the outer end 25 of the piece 21 across the outlet port 14 to a point 34 on the housing 10.

As will be apparent from FIGURE 1 the arrangement just described forms an elongated labyrinth-like path from the inlet port 13 through an inwardly extending spiral channel shown by the arrows 36, defined by one set of surfaces of the pieces 20, 21 and the baffles 31, 33, to the center 30 and thence outwardly through another spiral channel shown by the arrows 37, defined by the other set of surfaces of the pieces 20, 21, and the baffles 31, 33, to the outlet port 14.

A main requirement in the design of a cell which will yield efficient tritium detection is the necessity for bringing the tritium molecules into intimate contact with the radiation sensitive material. This requirement is satisfied by a detector cell made in accordance with the present invention so long as the adjacent "turns" of the spiral defined by the scintillation pieces 20, 21 are relatively close together (e.g. 1 mm.) with the result that molecules giving rise to the nuclear radiation to be detected are always very close to the surface of the radiation sensitive material, thus maximizing the chances that disintegration β particles will reach the scintillation material and produce pulses in the photomultiplier tubes. The area of the plastic scintillator presented to the tritiated air is also an important factor in the efficiency of the detector. The chosen geometry described above enables the use of a very large area of plastic phosphor in a relatively small total volume and preserving at the same time a very good light collection efficiency. The spiral arrangement greatly simplifies the problem of circulating the gas in and out of the detector without making obstruction to the scintillation light and it also provides uniform irradiation of all the regions of the detector cell. The relatively large volume of the gas sampled at any time permits the measurement of gases of low specific activities. The thin sheet of plastic scintillator give a low volume to an area ratio improving thereby the signal to noise ratio.

A most significant feature of the detector shown in FIGURES 1 and 2 is that the light generated within the scintillation material pieces 20 and 21 is directly "piped" by substantially total internal reflection within the pieces to each of the edges thereof where the pieces are light-coupled to the windows 16 and 17 as described above, which windows are adapted to be juxtaposed to the face plates of photomultiplier tubes. While other arrangements such as a stack of filamentary rods of scintillation material could also be used, the spiral arrangement of two elongated pieces of scintillation material is probably the easiest to make and has the important advantage that the flow path for the medium being monitored is known precisely and avoids diffculties due to uncertain "hold-up" times caused by dead spaces within the cell.

An important contribution to the performance of a detector cell made in accordance with the invention is due to the presence of the condensed layer of moisture which is present on any surface in an atmosphere bearing water vapour. The amount of surface moisture is related of course to the humidity of the air. The benefit accrues from the fact that the introduction of humid air bearing tritiated water vapour leads by an exchange process to the deposition of tritiated water upon the plastic scintillator where it is detected with high efficiency. Thus the efficiency of the detector for the detection of tritiated water vapour is higher than it is for the detection of tritium in the form of hydrogen gas. It is a fortunate coincidence that tritium in the form of hydrogen is very much less toxic (by about 1000×) than tritium in the form of water vapour so that an instrument calibrated to give a correct response to tritiated water vapour will not underestimate the hazard from tritium in the gaseous form. This phenomenon of the exchange of tritiated water molecultes with those of the film of water on the surface of the scintillation material, which is 99% completed in one or two minutes for rate of fluid flow between 5 to 10 litres per minute, is responsible for about 90% of the number of the useful pulses, the remaining 10% being produced by the disintegration β particles originating in the air between the walls of the plastic scintillator sheets and after having reached the scintillator have produced enough light to be detected.

Figure 3:
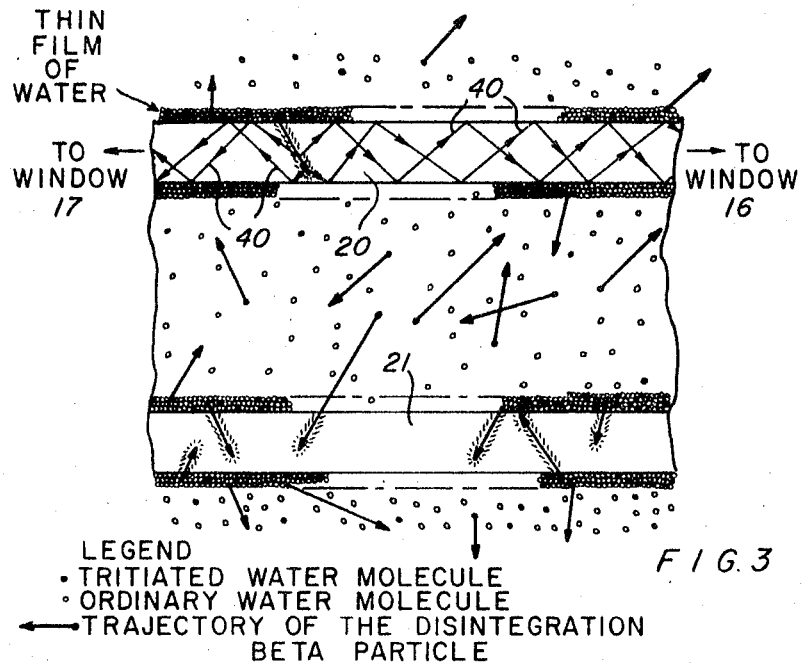
FIGURE 3 is an enlarged view of adjacent sections of scintillation material which is useful in explaining one of the most significant advantages of my invention.

This effect is illustrated in FIGURE 3 wherein two adjacent segments of the scintillation pieces 20 and 21 are shown in section. The passage of air having tritiated water vapour has caused a build-up of condensed moisture on each surface of the pieces 20, 21, some of the water being in the form of tritiated water molecules. As illustrated in the figure, such molecules are detected with a substantially higher efficiency than the tritiated water molecules located in the space between the pieces 20, 21 and are accordingly mainly responsible for the light pulses 40 which are directly "light piped" within the boundaries of the pieces 20, 21 to the windows 16, 17 and thence to the photoelectric sensing device.

In one example of a detector cell made in accordance with the invention the following specifications are used:

Housing: 2⅜" O.D. stainless steel tubing Type 304.
Scintillating material: 2 strips of 2" x 24" plastic phosphor .005" thick.
Coupling windows: Silica glass 2 mm. thick (Corning Glass No. 7910).
Cement: Carl H. Briggs R–313 bonding agent.

In the manufacture and assembly of the spiral scintilator core, the following procedure was used. 19 pieces of 0.005" polyethylene each 2" x 28" were prepared. These were formed into a "sandwich" with the two plastic phosphor strips and wound tightly around a 0.395" diameter mandrel so that the "layers" from the inside out were: 1 strip of polyethylene, 1 strip of plastic phosphor, 1 strip of polyethylene, 1 strip of plastic phosphor, and finally, on the outside, 16 layers of polyethylene. After this assembly was rolled as tightly as possible around the mandrel, the remaining strip of polyethylene was wrapped around it and tied with a string after making sure that all the ends were level. The assembly was then annealed for four hours at 78° C. ±2°, thereafter removed and allowed to cool. The string was then cut and the polythylene strips removed. The plastic phosphor strips were then assembled in a generally double spiral configuration with the ends "180° out of phase." Starting at the center, a 0.045" diameter string was inserted between the strips at points about ¼" from each edge so as to cause the strips to take up the parallel, spaced apart form illustrated in FIGURE 1. A surface of one of the windows 16 or 17 was then covered with a film of the R–313 bonding agent after which the spiral core assembly was placed thereon, pressure being applied to make sure that the whole of the edges of the strips at one end of the core came into contact with the cement. Clamps were applied and the assembly allowed to dry for 24 hours with air circulating within the spirals. After setting has occurred all of the strings were removed and the other window was cemented to the opposite end of the spiral core. Thereafter the inlet and outlet baffles 31 and 33 which in this case comprised spring stock, were cemented to the outer ends 24, 25 of the spiral, care being taken to make sure that the free ends of the baffles were flush with the edges of the windows. After this operation was completed, the complete core assembly was inserted within the housing in the position shown in FIGURE 1 and the R–313 bonding agent used to cement the windows 16, 17 to the housing.

In the procedures outlined above it is important that the bonding of the spiral scintillator core to the end plates be done with no more cement than is necessary to cause small "fillets" to appear along the edges of the scintillation pieces. In the event that an excess amount of cement is used, shrinking effects during hardening can produce hairline cracks which will lead to hold-up of contaminated air that will give the cell a "memory" effect.

Figure 4:
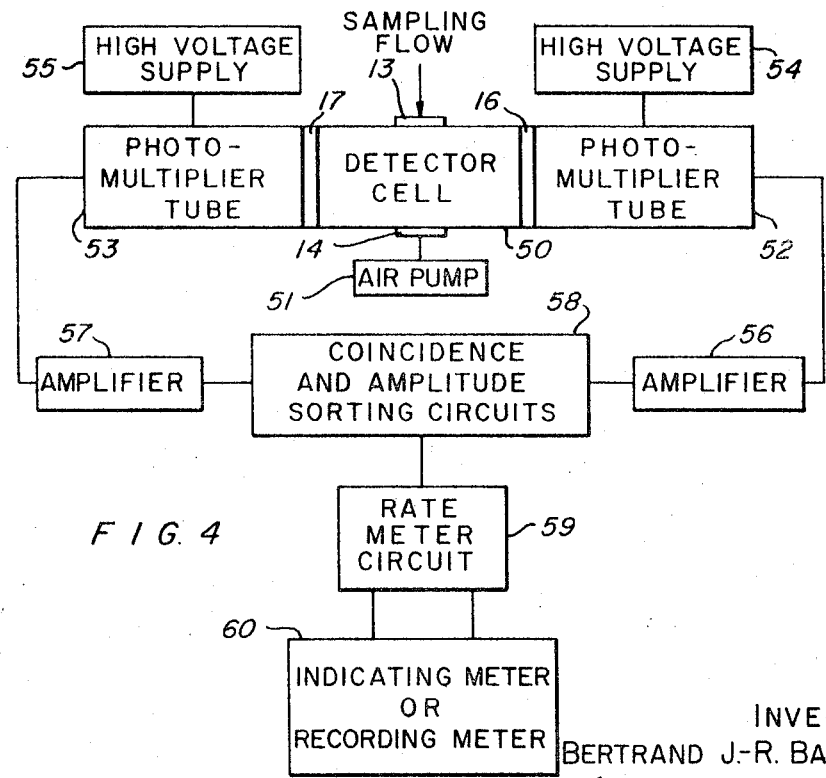
FIGURE 4 is a schematic diagram showing a suitable arrangement of a radiation monitor using a detector cell made in accordance with my invention.

A complete monitor unit incorporating a detector cell made in accordance with the invention will now be described briefly in connection with FIGURE 4 of the drawings. The detector cell generally represented at 50 is so arranged that an air pump 51 connected to the outlet port 14 draws a sample of the air to be monitored into the inlet port 13 and through the scintillator core. In accordance with the phenomenon described above, the scintillation light is directly "piped" to each of the windows 16, 17 which are juxtaposed to the light-sensitive surfaces of photomultiplier tubes 52, 53 as shown. These are in turn energized by high voltage supplies 54, 55 and the outputs of the tubes are, in accordance with the means well known in the art, fed through amplifiers 56, 57 to a coincidence and amplitude-sorting circuit 58 which in turn feeds a rate meter circuit 59 and an indicating or or recording meter 60.

Because only a relatively small total mass of plastic scintillator material is used in the detector cell, the response to gamma radiation is minimized. Furthermore, since the total bulk of the detector cell is relatively small, an air pump with quite limited capacity (only a few litres per minute) is adequate and it is posible, even in a portable instrument, to provide a limited quantity of lead shielding around the cell itself.

What I claim is:

1. A nuclear radiation detector cell comprising: an open-ended housing member having inlet and outlet ports; optically clear windows sealed across each of said ends, two elongated flat pieces of scintillation material disposed edge-wise between said windows and optically coupled to said windows along substantially the whole of each of the elongated edges of said pieces, said pieces being disposed in parallel spaced relationship to each other and forming a double spiral extending from the outer ends of the pieces adjacent the housing to the inner ends of the pieces near the center of the cell; and baffle members extending between the respective ports and outer ends of the pieces whereby there is defined a flow path for the medium to be monitored which includes, respectively, the inlet port, the inlet baffle member, a first spiral channel defined by one set of surfaces of said pieces leading inwards to the center of the cell, a second spiral channel defined by the other set of the surfaces of said pieces leading outwardly from the said center, the outlet baffle member and the outlet port.

2. A nuclear radiation detector comprising: an open-ended housing having inlet and outlet ports for the medium to be monitored; and a core consisting of a pair of end windows sealed across the open ends of the housing, and at least two relatively thin elongated strips of scintillation material disposed edge-wise between said windows and optically coupled thereto; said strips defining between them an elongated double-spiral path for said medium, which is generally parallel to the length of the strips; and means coupling the entery and exit ends of said path to the inlet and outlet ports respectively.

3. A core for a nuclear radiation detector comprising two juxtaposed and spirally wound strips of light-transmitting scintillation material disposed between two substantially parallel planes so as to define between said strips an elongated flow-path for a medium to be monitored; an optically clear window light-coupled to, and along substantially the whole of the length of one of the two opposite edges of each of said strips, which edges extending generally parallel to said path; and another optically clear window similarly light-coupled to the other edge of each of said strips; each of said windows being adapted to be juxtaposed to the light-sensitive element of a photoelectric sensing device.

References Cited

UNITED STATES PATENTS 2,855,520 10/1958 Stoddart et al. _____ 250—71.5
3,005,100 10/1961 Thompson _____ 250—71.5
3,169,187 2/1965 Stone et al. _____ 250—71.5

ARCHIE R. BORCHELT, Primary Examiner

U.S. Cl. X.R.

250—83.3